United States Patent
Doy et al.

(10) Patent No.: US 10,960,938 B2
(45) Date of Patent: Mar. 30, 2021

(54) MOVABLE OPERATOR STATION MOVEMENT LIMITING SYSTEM

(71) Applicant: Caterpillar Paving Products Inc., Brooklyn Park, MN (US)

(72) Inventors: Nathaniel S. Doy, Maple Grove, MN (US); Lee M. Hogan, Champlin, MN (US); Nicholas B. Johnson, Dayton, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 0 days.

(21) Appl. No.: 16/808,723

(22) Filed: Mar. 4, 2020

(65) Prior Publication Data

US 2020/0198709 A1 Jun. 25, 2020

Related U.S. Application Data

(63) Continuation-in-part of application No. 16/140,097, filed on Sep. 24, 2018.

(51) Int. Cl.
*B62D 33/063* (2006.01)
*E02F 9/16* (2006.01)
(Continued)

(52) U.S. Cl.
CPC ............ *B62D 33/0636* (2013.01); *E02F 9/16* (2013.01); *E02F 9/166* (2013.01); *E01C 23/088* (2013.01);
(Continued)

(58) Field of Classification Search
CPC ........ E02F 9/166; E02F 9/16; B62D 33/0636; B62D 33/0625
See application file for complete search history.

(56) References Cited

U.S. PATENT DOCUMENTS 3,182,605 A * 5/1965 Brasher .................. B61C 17/04
105/342
4,026,379 A * 5/1977 Dunn ...................... B60N 2/143
180/331
(Continued)

FOREIGN PATENT DOCUMENTS

CN 202641889 U 1/2013
DE 102017108377 A1 * 10/2018 .............. E02F 9/163
WO WO-2007074850 A1 * 7/2007 .............. B60N 2/502

*Primary Examiner* — Nicole T Verley
(74) *Attorney, Agent, or Firm* — Calfee, Halter & Griswold LLP

(57) ABSTRACT

A mobile machine having a machine frame with a lateral outer wall, an operator station having an outer side edge, an actuating system configured to move the operator station between a retracted position and a fully extended position that is laterally outward of the retracted position, wherein in the fully extended position, the outer side edge is a first distance outward of the lateral outer wall, a moveable component moveable between a first position and a second position, a sensor configured to send a signal indicative of the moveable component being in the first position, and a controller configured to limit the distance the operator station may move laterally outward of the retracted position to a second distance in response to receiving the signal from the sensor, wherein the second distance is less than the first distance.

20 Claims, 13 Drawing Sheets

(51) Int. Cl.
*E01C 23/12* (2006.01)
*E01C 23/088* (2006.01)

(52) U.S. Cl.
CPC ........ *E01C 23/127* (2013.01); *E01C 2301/30* (2013.01)

(56) References Cited

U.S. PATENT DOCUMENTS

| | | | |
|---|---|---|---|
| 4,057,213 A | 11/1977 | Kokkila | |
| 4,682,666 A * | 7/1987 | Klee | B62D 33/0636 |
| | | | 180/89.13 |
| 7,004,275 B1 | 2/2006 | Junga et al. | |
| 7,204,546 B2 * | 4/2007 | Antonetti | B62D 33/0633 |
| | | | 180/89.13 |
| 8,136,835 B2 * | 3/2012 | Rajasingham | B60N 2/665 |
| | | | 280/736 |
| 8,499,872 B2 * | 8/2013 | Haubrich | E02F 9/202 |
| | | | 180/89.13 |
| 8,590,983 B2 * | 11/2013 | Berning | E01C 23/127 |
| | | | 299/39.4 |
| 8,800,705 B2 * | 8/2014 | Riha | B62D 33/0636 |
| | | | 180/89.17 |
| 8,979,175 B2 * | 3/2015 | Kim | B62D 33/073 |
| | | | 296/190.04 |
| 9,045,320 B2 * | 6/2015 | Turrini | B60P 3/1091 |
| 9,045,871 B2 * | 6/2015 | Graham | E01C 23/07 |
| 9,181,664 B2 * | 11/2015 | Berning | E01C 23/088 |
| 9,573,633 B2 * | 2/2017 | Behrens | B62D 33/0636 |
| 9,783,056 B2 * | 10/2017 | Klein | E01C 23/088 |
| 10,011,191 B2 | 7/2018 | Reif et al. | |
| 10,100,471 B2 | 10/2018 | Berning et al. | |
| 10,625,557 B2 * | 4/2020 | Knisley | B60G 17/0162 |
| 2010/0300796 A1 | 12/2010 | Ryan et al. | |
| 2013/0241251 A1 * | 9/2013 | Jones | B60N 2/24 |
| | | | 297/217.1 |
| 2016/0160454 A1 | 6/2016 | Berning et al. | |
| 2019/0186089 A1 | 6/2019 | Barimani et al. | |
| 2020/0125104 A1 * | 4/2020 | Kuriyagawa | A01D 34/71 |
| 2020/0248431 A1 * | 8/2020 | Takaoka | E02F 9/166 |
| 2020/0317480 A1 * | 10/2020 | Shankar | B66F 3/44 |
| 2020/0318317 A1 * | 10/2020 | Kajiwara | B60T 7/22 |

* cited by examiner

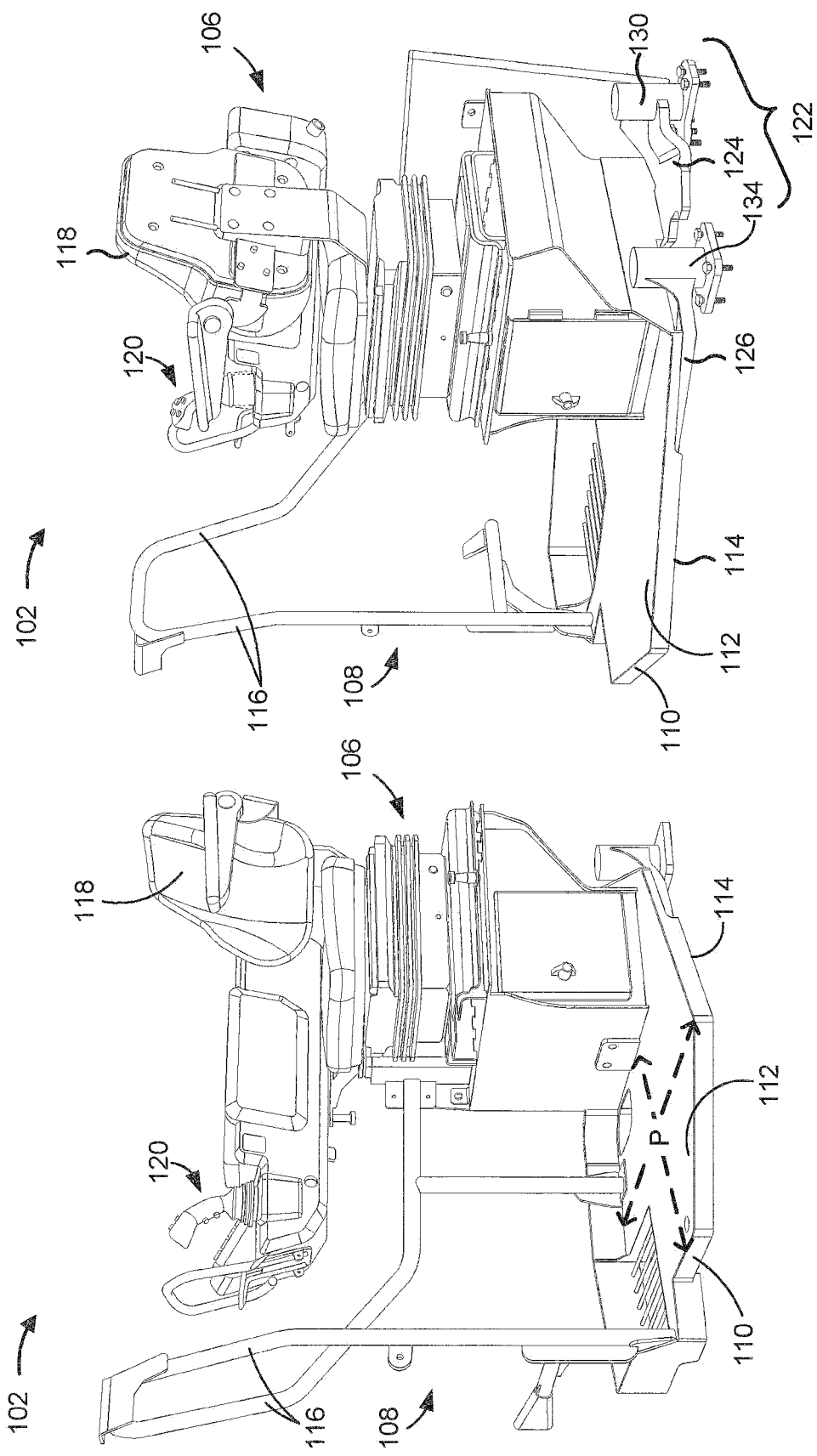

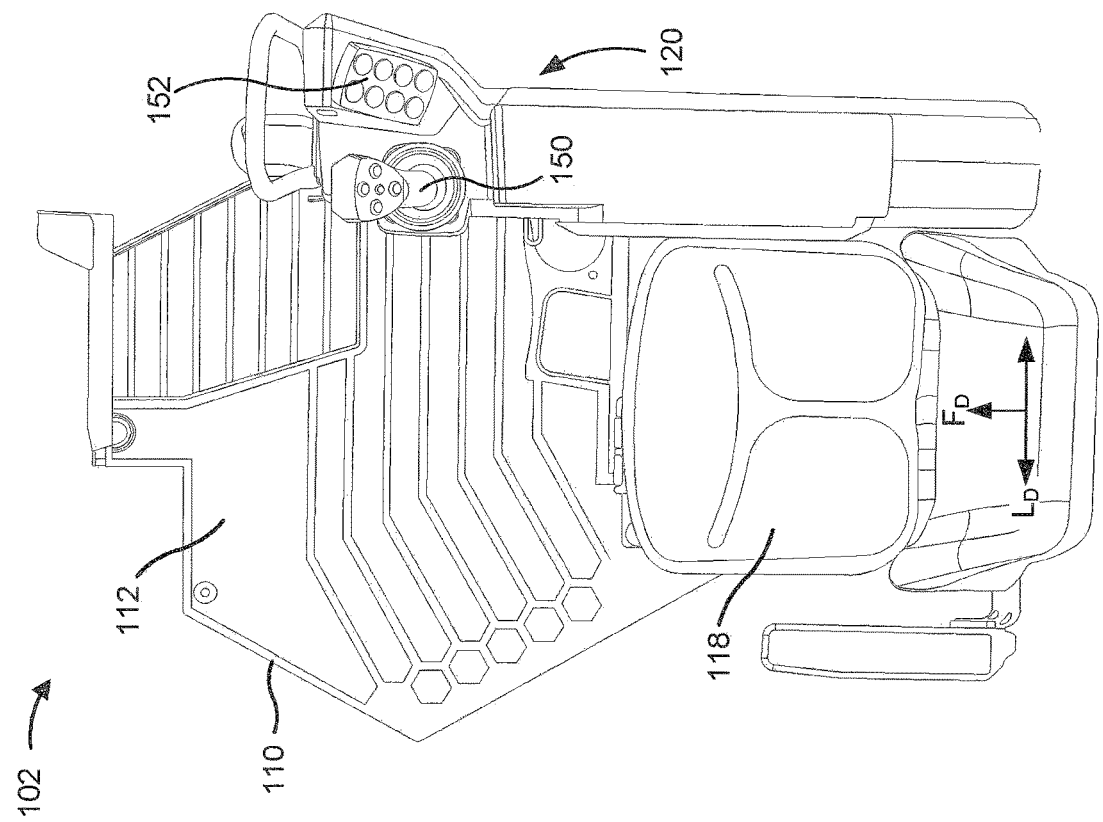
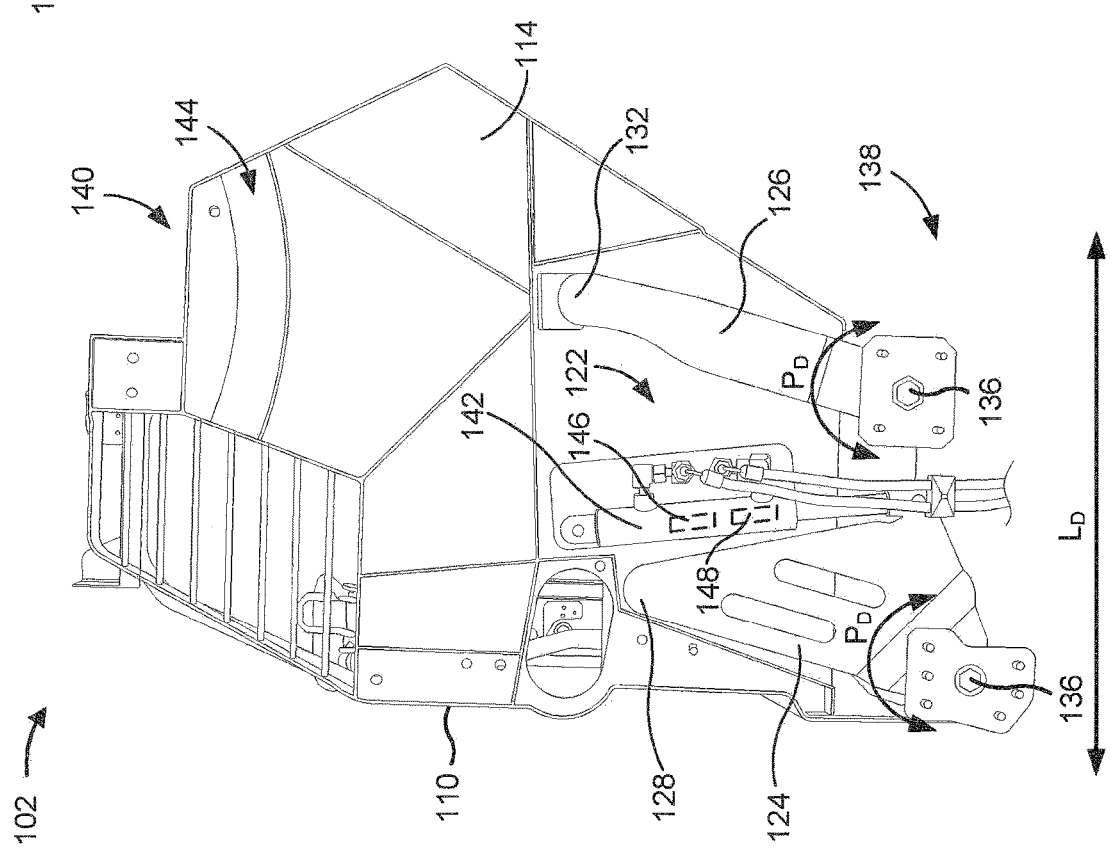

MOVABLE OPERATOR STATION MOVEMENT LIMITING SYSTEM

RELATED APPLICATIONS

This application is a continuation-in-part of U.S. patent application Ser. No. 16/140,097, filed Sep. 24, 2018, which is hereby incorporated by reference in its entirety as though fully set forth in the present application.

TECHNICAL FIELD

The present disclosure relates generally to a machine having a movable operator station, and, more particularly, to a machine having a system that selectively limits the movement of the operator station under certain conditions.

BACKGROUND

Various types of machines used, for example, in the construction industry, include operator stations. The operator stations contain various systems and controls by which an operator can control the machine to perform an operation (e.g., a paving operation, a milling operation, and/or the like). Such operator stations are generally arranged at the rear of a machine frame, which may obstruct the operator's visibility and/or interfere with the operator's ability to oversee aspects of the operation.

Some machines may include a moveable operator station to improve the operator's visibility while operating the machine in specific circumstances. For example, U.S. Pat. No. 10,100,471, to Berning et al. discloses an automotive construction machine having an operator's platform that is moveable on the machine frame transversely to the direction of travel and outwards beyond the lateral outer wall of the machine frame. When extended laterally outwards, the machine driver in the operator's platform can observe the lateral outer wall and the area next to the outer wall.

On some machines, however, a moveable operator station may interfere with one or more other components of the machine that could cause damage to the components, the operator station, and/or the system for moving the operator station.

SUMMARY

According to some implementations, the present disclosure is related to a mobile machine having a machine frame with a lateral outer wall, an operator station having an outer side edge, an actuating system configured to move the operator station between a retracted position and a fully extended position that is laterally outward of the retracted position, wherein in the fully extended position, the outer side edge is a first distance outward of the lateral outer wall, a moveable component moveable between a first position and a second position, a sensor configured to send a signal indicative of the moveable component being in the first position, and a controller configured to limit the distance the operator station may move laterally outward of the retracted position to a second distance in response to receiving the signal from the sensor, wherein the second distance is less than the first distance.

According to some implementations, the present disclosure is related to a method of preventing interference between a moveable operator station of a mobile machine and a moveable component of the mobile machine, where the operator station is moveable between a retracted position and a fully extended position that is a first distance laterally outward of the retracted position. The method includes sending a signal indicative of the moveable component being in a first position and limiting movement of the operator station laterally outward of the retracted position to a second distance that is less than the first distance.

BRIEF DESCRIPTION OF THE DRAWINGS

FIG. 3 is a left front perspective view of an example movable operator station of the machine of FIG. 1;

FIG. 4 is a left rear perspective view of the movable operator station of FIG. 3;

FIG. 5 is a bottom plan view of the moveable operator station of FIG. 3;

FIG. 6 is a top plan view of the moveable operator station of FIG. 3;

DETAILED DESCRIPTION

Figure 1:
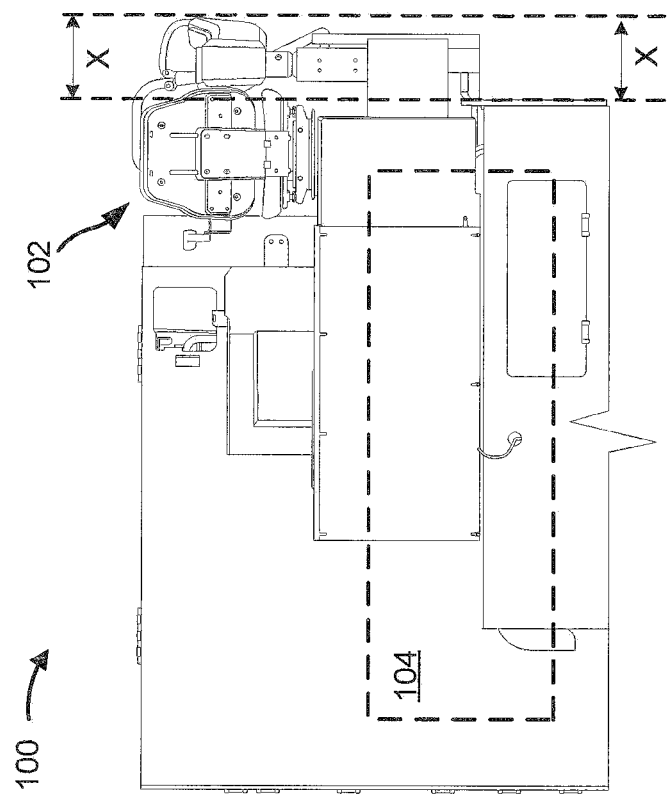
FIG. 1 is a rear view of an example machine with a moveable operator station in a retracted position.
Figure 2:
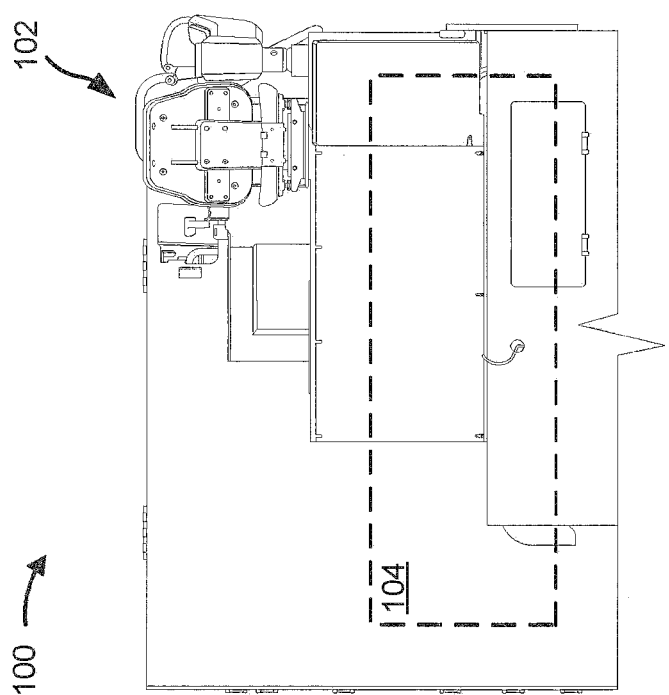
FIG. 2 is a rear view of the machine of FIG. 1 with the moveable operator station in an extended position.

FIGS. 1 and 2 are diagrams of an example machine 100 including a movable operator station 102 and a working implement 104 (i.e., shown schematically in broken lines, as the working implement may not be visible from outside of the machine). In some implementations, the machine 100 may be a mobile machine, such as construction equipment used in the construction industry to perform a construction task by way of the working implement 104. As an example, the machine 100 may include a cold planer machine (i.e., a milling machine), a rotary mixing machine, an asphalt paving machine, and/or the like. Example working implements 104 may include a cutting drum or mill, a rotor chamber, a breaker bar, a mixing chamber, a hopper, a conveyor, a screed, and/or the like. As FIGS. 1 and 2 indicate, the operator station 102 may be movable relative to the machine 100 and/or the working implement 104, so that an operator may be positioned outside of a machine frame (e.g., a machine body). In this way, operator visibility over a task being performed by the machine 100 and/or the working implement 104 may improve.

Referring to FIG. 2, and in some implementations, the operator station 102 may be linearly movable relative to the machine 100 and/or the working implement 104. For example, the operator station 102 may linearly translate relative to the machine 100 and/or the working implement 104, for positioning the operator station 102 outside of the machine frame. In this way, the machine 100 may be prevented from obstructing the view of an operator (not shown) disposed in the operator station 102. In some implementations, the operator station 102 may move a distance X, so that the operator disposed in the operator station 102 may be positioned (e.g., via sliding, translating, swiveling, and/or the like) outside of the machine 100, for improved visibility. In some implementations, the operator disposed in the operator station 102 may be maintained in a forward-facing position during movement of the operator station 102 in a linear direction relative to the machine 100 and/or the working implement 104.

In some implementations, the operator station 102 may move a distance X outboard of the machine 100. As an example, distance X may include a distance of at least about 25 millimeters (mm), a distance of at least about 50 mm, a distance of at least about 100 mm, a distance of at least about 200 mm, a distance of at least about 215 mm, a distance of at least about 300 mm, and/or the like. In some implementations, the distance X may be less than about 25 mm and/or greater than about 300 mm.

FIGS. 1 and 2 are provided as examples. Other examples are possible and may differ from what was described in connection with FIGS. 1 and 2. In other words, the machine 100, the components shown as being included in the machine 100, and/or the arrangement of these components, are provided for illustrative purposes only.

FIGS. 3 and 4 are perspective views of the example the movable operator station (e.g., operator station 102) that may be included in the machine 100 of FIGS. 1 and 2. For purposes of clarity, some of the components shown and described in association with FIGS. 1 and 2 may be omitted from FIGS. 3 and 4.

Referring to FIGS. 3 and 4, and in some implementations, the operator station 102 may include a first end 106, a second end 108 opposite first end 106, and a platform 110 extending between the first end 106 and the second end 108. In some implementations, the platform 110 may be provided or disposed in a plane P (e.g., schematically illustrated by broken lines), and linearly translate in and/or along plane P to move the operator station 102 relative to a machine (see, e.g., machine 100, FIGS. 1 and 2). In some implementations, the platform 110 may include a first surface 112 (e.g., an upper surface) and a second surface 114 (e.g., a lower surface) opposite the first surface 112. The platform may be supported on or over the first surface 112 of the platform 110 during operation of the machine including the operator station 102. One or more handrails 116 may be provided for improved stability of an operator while sitting or standing on and/or over the platform 110.

In some implementations, an operator chair 118 may be provided proximate to the first end 106 of the operator station 102. Further, in some implementations, an operator may operate and/or control various aspects of a machine by way one or more controls disposed in an operator console area 120 of the operator station 102. Such controls may be used to control (e.g., a speed, direction, and/or the like) of a working implement (e.g., working implement 104, FIG. 1), actuate the working implement, control a machine, actuate the machine, and/or the like. Such controls may additionally be used to move the operator station 102 relative to the machine and/or relative to components included in and/or associated with the machine Referring to FIG. 4, and in some implementations, the operator station 102 may include an actuating system 122. The actuating system 122 may be configured to move the operator station 102 relative to a machine and/or other components (e.g., a machine frame, a working implement, and/or the like) included in and/or associated with the machine. In some implementations, the actuating system 122 may be configured to move the operator station 102 on or over portions of the machine by way of a four-bar linkage type of device or system, which is configured to maintain an operator, in the operator station 102, in a forward-facing position during movement of the operator station 102. In some implementations, the actuating system 122 may be located or disposed proximate to the first end 106 of the operator station 102. In some implementations, some portions of the actuating system 122 may be attached to the operator station 102, and some other portions of the actuating system 122 may be attached to a machine frame (see, e.g., the machine frame 154, FIG. 7) for facilitating movement between the operator station 102 and the machine frame.

In some implementations, the actuating system 122 may include at least a first linkage member 124, a second linkage member 126, and an actuating member (see, e.g., 142, FIG. 5). Respective first and second linkage members 124 and 126 may be attached to the second surface 114 of the platform 110 and may be actuated by the actuating member (see, e.g., the actuating member 142, FIG. 5). In some implementations, the first linkage member 124 may include a first proximal end (see, e.g., the first proximal end 128, FIG. 5) and a first distal end 130, and the second linkage member 126 may include a second proximal end (see, e.g., the second proximal end 132, FIG. 5) and a second distal end 134. The actuating system 122 may be configured to move platform 110 by way of a synchronized pivoting or rotating of respective first and second distal ends 130 and 134 of respective first and second linkage members 124 and 126 on, over, and/or around one or more pins (see, e.g., pins 136, FIG. 5) attached to the machine frame as described herein.

Turning now to FIGS. 5 and 6, plan views of example operator station 102 that may be included in the machine of FIGS. 1 and 2, are shown. FIG. 5 illustrates an example bottom plan view of the operator station 102, including a view along the second surface 114. FIG. 6 illustrates an example top plan view of the operator station 102, including a view along the first surface 112. For purposes of clarity, some of the components shown and described in association with FIGS. 1-4, may be omitted from FIGS. 5 and 6.

As FIG. 5 illustrates, the platform 110 may include a first end 138 and a second end 140 opposite the first end 138. In some implementations, the actuating system 122, including the first linkage member 124, the second linkage member 126, and/or an actuating member 142, may be attached to and/or disposed proximate to the first end 138 of the platform 110. A groove 144 may be disposed proximate to the second end 140 of the platform 110. In some implementations, the groove 144 may be configured to receive a support member (see, e.g., support member 160, FIG. 7), which may support the second end 140 of the platform 110 during movement of the platform 110 in and/or along a plane (e.g., plane P, FIG. 3). In some implementations, the platform 110 may be configured to move in one or more linear directions LD by way of pivoting the first linkage member 124 and the second linkage member 126 in a same pivoting direction PD relative to one or more respective pins 136. In some implementations, the first linkage member 124 and the second linkage member 126, or portions thereof, may remain substantially parallel during pivoting around the pins 136 to facilitate linear translation of the platform 110 in or along the plane. In this way, the platform 110 and/or the components thereof and/or the components attached thereto, may continuously face a same direction during movement of the platform 110 in and/or along the plane.

In some implementations, the actuating member 142 may be attached to portions of the first linkage member 124. The actuating member 142 may be configured to induce pivoting of the first linkage member 124 around a respective pin 136 by way of linearly extending or retracting a rod (see, e.g., 145, FIG. 7) that may be coupled to the first linkage member 124. The first linkage member 124 may, in turn, induce pivoting of the second linkage member 126 around a respective pin 136. In some implementations, the actuating member 142 may include a linear actuator or a linear actuating member, such as, for example, a hydraulic cylinder. In some implementations, the actuating member 142 may include a piston 146 (e.g., shown schematically in broken lines, as the piston may not be visible from outside of the actuating member 142), for driving the rod, and a sensor device 148 (e.g., also shown schematically in broken lines, as the sensor device may not be visible from outside of the actuating member 142), which may be attached to and/or otherwise disposed proximate to the piston 146. In some implementations, the sensor device 148 may be configured to detect an amount of extension or retraction of the piston 146, and/or the rod attached thereto, so that a distance (e.g., distance X, FIG. 2) by which platform 110 moves may be controllable based on the amount of extension or retraction of the piston 146. In this way, a spatial location of platform 110 may be determined and/or controlled based on the amount of extension and/or retraction of piston 146.

Turning now to FIG. 6, and in some implementations, the operator station 102 may swivel inboard and/or outboard of a machine (see, e.g., 100, FIGS. 1 and 2) during pivoting of one or more linkage members (see, e.g., 124 and 126, FIG. 5), which may collectively form a four-bar linkage system or device. In some implementations, the operator station 102 and/or the components thereof (e.g., the platform 110, the operator chair 118, and/or the like), may be provided in a facing direction FD, and may be maintained in the facing direction FD during pivoting of the one or more linkage members. In this way, an operator may be provided and/or maintained in a desired position (e.g., a forward-facing position and/or the like) during movement of the operator station 102. In some implementations, the facing direction FD may correspond to a direction of travel of the machine to which the operator station 102 is attached.

Referring to FIG. 6, and in some implementations, a first control device 150 may be provided in the operator console area 120 of the operator station 102. As an example, the first control device 150 may include a joystick type of control device that may be communicatively coupled to one or more machine systems (e.g., a drive system, a working implement system, and/or the like) to control various aspects of the machine, such as a speed of the machine, a direction of travel of the machine, a task being performed by the machine, and/or the like. In some implementations, a second control device 152 may be provided in the operator console area 120 of the operator station 102. As an example, the second control device 152 may include a push-button control device that may be communicatively coupled to the actuating member 142. In this way, the push-button control device may be used to actuate, drive, instruct, and/or otherwise control the actuating member 142 for moving the operator station 102 inboard or outboard, relative to the machine, by way of an intuitive, operator-friendly control device.

FIGS. 3-6 are provided as examples. Other examples are possible and may differ from what was described in connection with FIGS. 3-6. In other words, the operator station 102, the components shown as being included in the operator station 102, and/or the arrangement of the components, are provided for illustrative purposes only.

Figure 7:
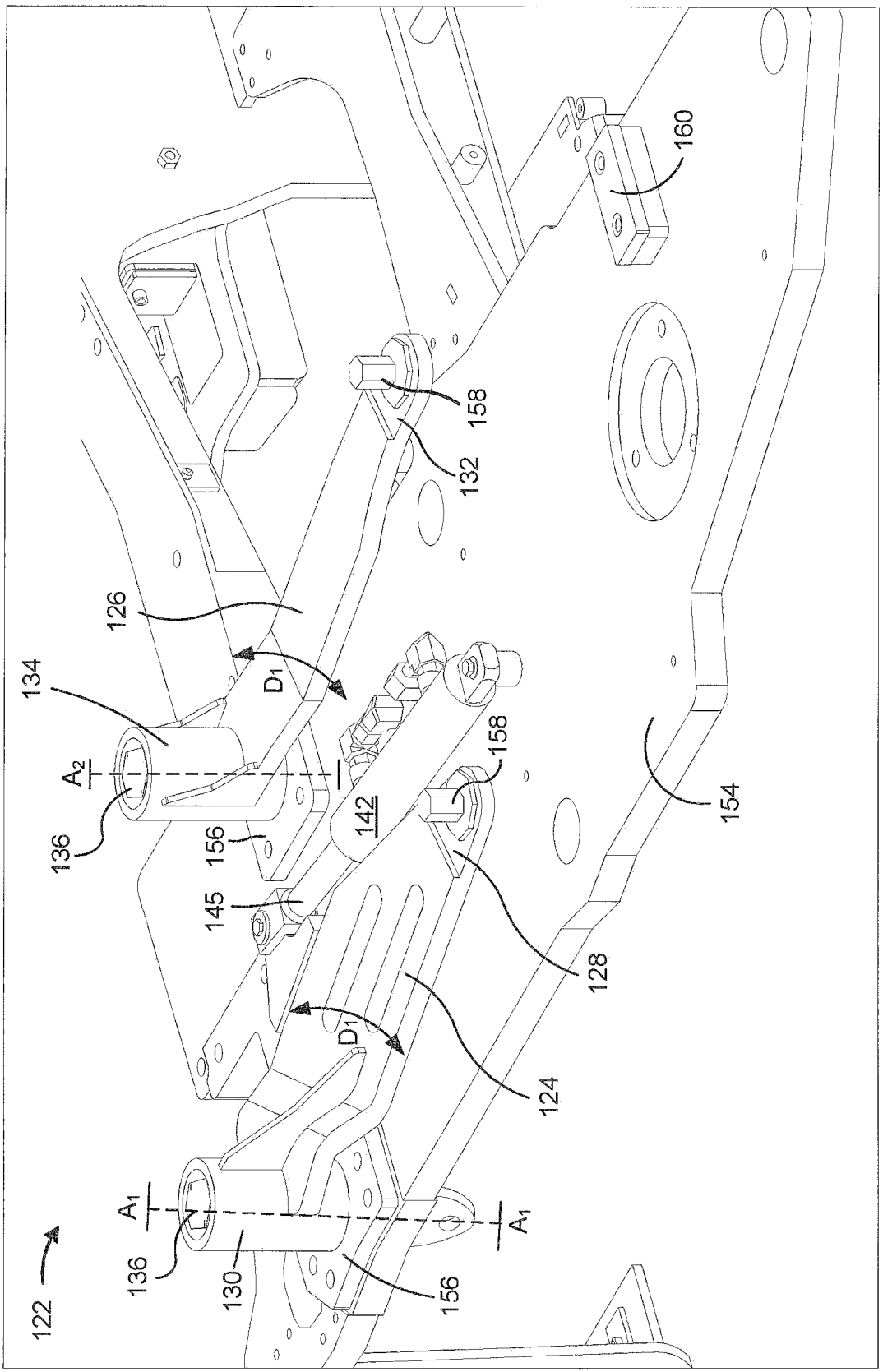
FIG. 7 is a diagram of an example actuating system associated with the moveable operator station of FIG. 3.

Turning now to FIG. 7, a diagram of the example actuating system 122 associated with example the operator station 102 included in the machine of FIGS. 1 and 2, is shown. For purposes of clarity, some of the components shown and described in association with FIGS. 1-6 may be omitted from FIG. 7.

Referring to FIG. 7, the actuating system 122 may include the first linkage member 124, the second linkage member 126, and the actuating member 142. In some implementations, the actuating system 122 may attach to portions of an operator station (see, e.g., operator station 102, FIGS. 3-6) and portions of a machine frame 154. In this way, the operator station may move relative to the machine frame 154 and/or a machine to which machine frame 154 forms or connects. In some implementations, one or more mounting members 156, such as mounting plates, brackets, housings, and/or the like, may be used to attach the pins 136 to the machine frame 154. In this way, the pins 136 may act or serve as pivot axes about which the first linkage member 124 and the second linkage member 126, included in the actuating system 122, may pivot when actuated by the actuating member 142. For example, the first distal end 130 of the first linkage member 124 may be disposed on, over, and/or around a respective pin 136 for sliding, swiveling, and/or otherwise pivoting in a first direction Di around a first pivot axis $A_1$ formed by the respective pin 136. Similarly, the second distal end 134 of the second linkage member 126 may be disposed on, over, and/or around a respective pin 136 for sliding, swiveling, or otherwise pivoting in first direction Di around a second pivot axis A2 formed by the respective pin 136. In some implementations, the respective first and second pivot axes $A_1$ and A2 may be substantially orthogonal to a plane (see, e.g., plane P, FIG. 3) of a platform (see, e.g., 110, FIGS. 3-6) included in an operator station (see, e.g., 102, FIGS. 3-6). In some implementations, the platform and the machine frame 154 may be disposed in and/or along parallel planes, so that the platform may move over the machine frame 154 by way of the actuating system 122.

In some implementations, the actuating member 142, or a portion thereof, such as a rod 145 thereof, may extend or retract based on an amount of hydraulic pressure supplied to the actuating member 142. The forces or motions associated with the extension or retraction of the actuating member 142 may be imparted to the first linkage member 124, for inducing movement (e.g., pivoting and/or the like) of the first linkage member 124 in first direction Di and inducing movement of the second linkage member 126 in first direction Di. In some implementations, the platform (see, e.g., 110, FIGS. 3-6) attached to the actuating system 122 may move in a linear direction during pivoting of the first linkage member 124 and the second linkage member 126 in first direction Di.

In some implementations, the actuating system 122 may connect to the platform of the operator station (see, e.g., 102, FIGS. 3-6) for moving the platform respective to the machine frame 154. For example, one or more connecting members 158 may be used to connect portions of the actuating system 122 to the platform of the operator station. In some implementations, the first proximal end 128 of the first linkage member 124 may include one or more connecting members 158 that extend between and/or connect the first linkage member 124 and the platform. Similarly, the second proximal end 132 of the second linkage member 126 may include one or more connecting members 158 that connect the second linkage member 126 to the platform. Example connecting members 158 include, without limitation, pins, rods, bars, clips, bolts, threaded connectors (e.g., screws), and/or the like. In some implementations, the platform may move in a linear direction (see, e.g., LD, FIG. 6) during pivoting of the first linkage member 124 and the second linkage member 126 in first direction Di, so that the platform may be maintained in a facing direction (see, e.g., FD, FIG. 6) during pivoting of the first linkage member 124 and the second linkage member 126 in first direction Di.

Still referring to FIG. 7, and in some implementations, a support member 160 may be provided on or over the machine frame 154 for supporting the operator station 102 as the operator station 102 moves relative to the machine frame 154. In some implementations, the support member 160 may engage a groove (see, e.g., 144, FIG. 5) of the operator station to improve the weight distribution and/or balance of the operator station as the operator station moves relative to the machine frame 154. As an example, the support member 160 may include and/or be at least partially formed by a material having a low resistance to movement, such as a plastic, polymeric, and/or metallic material.

FIG. 7 is provided as an example. Other examples are possible and may differ from what was described in connection with FIG. 7. In other words, the actuating system 122, the components shown as being included in the actuating system 122, and/or the arrangement of the components, are provided for illustrative purposes only.

Figure 8:
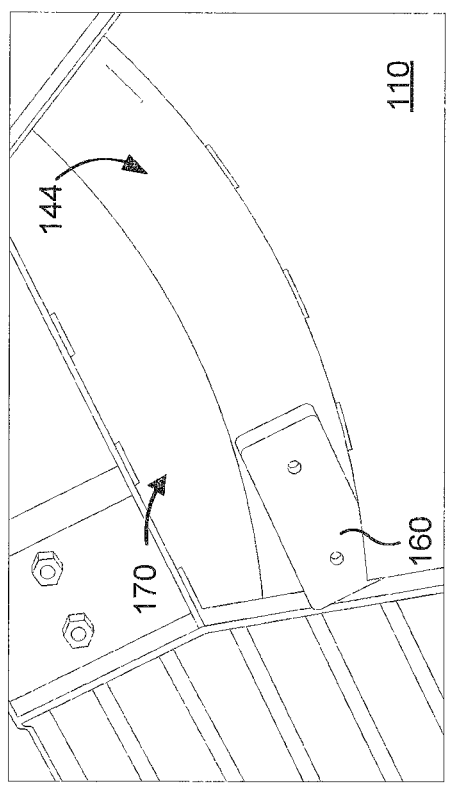
FIG. 8 is a diagram of an example support system associated with the moveable operator station of FIG. 3.

FIG. 8 is a diagram of an example support system 170 associated with the example operator station 102 that may be included in the machine of FIGS. 1 and 2. For purposes of clarity, some of the components shown and described in association with FIGS. 1-7 may be omitted from FIG. 8.

Referring to FIG. 8, and in some implementations, the support system 170 may include the groove 144 and the support member 160. In some implementations, the groove 144 may be provided on, over, and/or within a portion of the platform 110. As an example, the groove 144 may be machined in the platform 110. As another example, the groove 144 may be formed in an attachment member that attaches to the platform 110 by way of welding, bolting, and/or the like. In some implementations, the support member 160 may be provided on or over the machine frame (e.g., the machine frame 154, FIG. 7) facing the platform 110. As an example, the support member 160 may include a support pad that attaches to the machine frame by way of welding, threading, bolting, and/or the like.

In some implementations, the support member 160 may be rigidly attached to the machine frame, and move (e.g., via sliding and/or the like) within the groove 144 as the platform 110 moves relative the machine frame. In some implementations, the groove 144 may be configured to be engage and/or retain the support member 160, so that the support member 160 may improve the weight distribution and/or guided movement of the operator station relative to the machine frame.

As noted above, FIG. 8 is provided as an example. Other examples are possible and may differ from what was described in connection with FIG. 8. In other words, the support system 170, the components shown as being included in the support system 170, and/or the arrangement of the components, are provided for illustrative purposes only.

Figure 9:
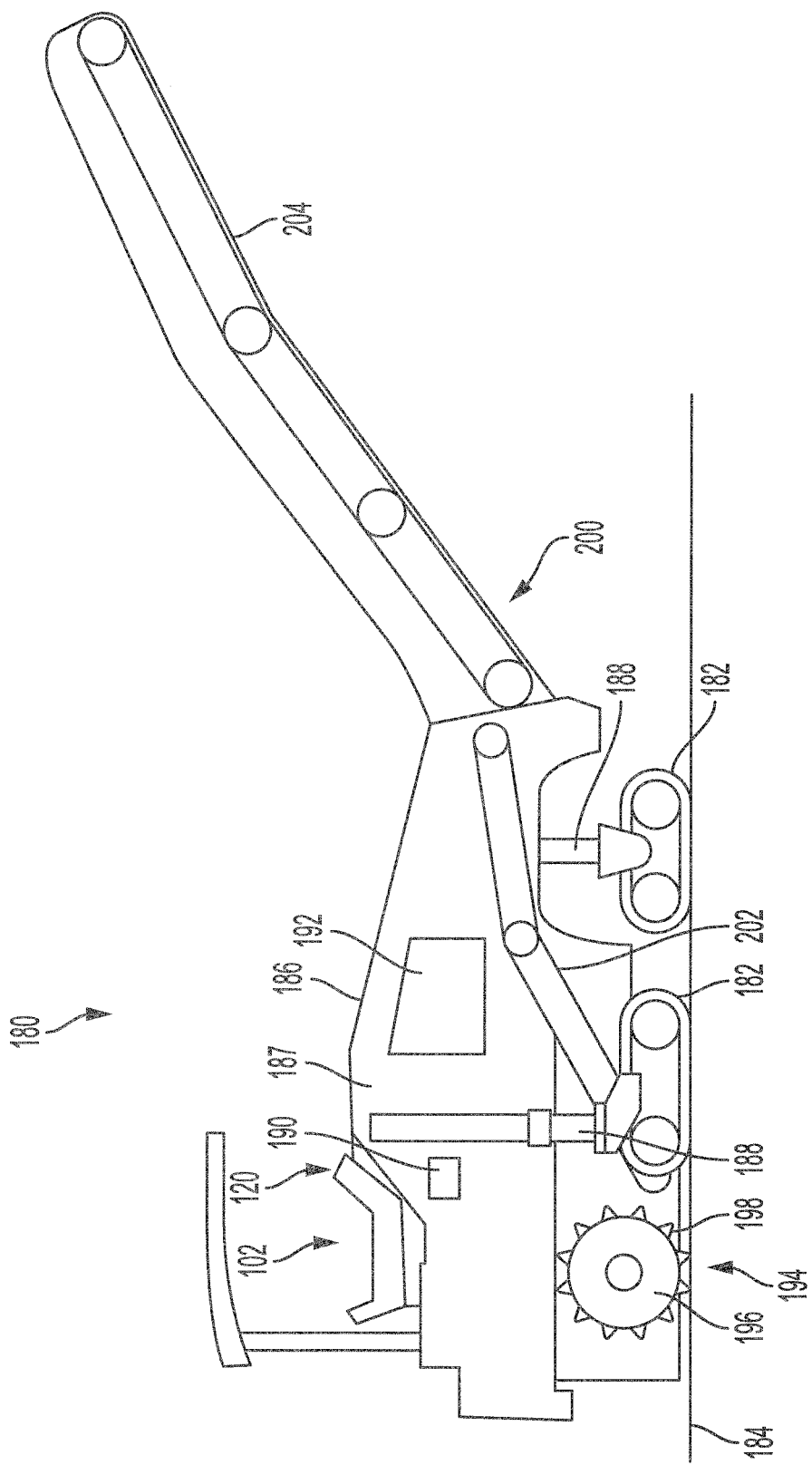
FIG. 9 is a side view of the example machine of FIG. 1.

FIG. 9 illustrates an exemplary embodiment of a machine 180 that includes a movable operator station (e.g., operator station 102). For purposes of clarity, some of the components shown and described in association with FIGS. 1-8 may be omitted from FIG. 9. The machine 180 may be any machine having a movable operator station, such as a mobile machine used in the construction industry to perform a construction task. For example, the machine 180 may be a cold planer machine (i.e., a milling machine), a rotary mixing machine, an asphalt paving machine, and/or the like.

In the exemplary embodiment of FIG. 9, the machine 180 is illustrated as a cold planer. The "cold planer" may be defined as any machine used to break and remove layers of hardened material from an existing road surface. The machine 180 may include a plurality of ground engaging units 182 for propelling the machine 180 along a road surface 184. The ground engaging units 182 of the machine 100 are connected to a frame 186 of the machine 180 by legs 188, such as hydraulic legs. Although the ground engaging units 182 of the machine 180 are shown to include tracks, the ground engaging units 182 may alternatively include a set of wheels.

The frame 186 supports the operator station 102 and includes a vertically arranged, right side, lateral outer wall 187. The machine further includes a controller 190. The one or more control devices 150, 152 may be in wireless or wired communication with the controller 190 to provide commands to the controller 190. The controller 190 may send control signals based on the commands, to one or more actuators (not shown) of the one or more of the ground engaging units 182 and the legs 188. In the case of electrically activated actuators, the control signals may act directly on the respective actuators. In the case of hydraulically activated actuators, the control signals may act on valves, which in turn control flow of pressurized fluid to the actuators. The controller 190 may be a separate control unit or may be part of a central control unit operable to control additional functions of the machine 180.

The frame 186 may also support a power source, such as an engine 192. The engine 192 may supply power to the ground engaging units 182 to propel the machine 180 on the road surface 184. In one embodiment, this is accomplished by driving a hydraulic pump (not illustrated) with an output of the engine 192, which in turn supplies high-pressure hydraulic fluid to individual motors (not illustrated) associated with the ground engaging units 182.

The machine 180 may also include a milling system 194 supported by the frame 186. The milling system 194 may also receive power from the engine 192. The milling system 194 facilitates milling of the road surface 184. The milling system 194 includes a milling drum 196, and a plurality of cutting tools 198 disposed circumferentially around the milling drum 196. A cutting plane of the machine 180 is tangential to the bottom of the milling system 194 and parallel to the direction of travel of the machine 180. The milling drum 196 of the milling system 194 rotates, upon receiving power from the engine 192, and accordingly the plurality of cutting tools 198 can be caused to come in repeated contact with the road surface 184 to break up a layer of material from the road surface 184. The legs 188, when configured as hydraulic legs, can act as elongated telescopic actuators configured to raise and lower the milling system 194 relative to the ground engaging units 182 so as to control a depth of cut by the milling system 194.

A conveyor system 200 is provided on the machine 180 to collect material, such as excavated asphalt produced during breaking up of the road surface 184 by the milling system 194. The conveyor system 200 also transports the collected material to a discharge location, such as a transport vehicle (not shown). Specifically, the conveyor system 200 can include a lower conveyor belt 202 and an upper conveyor belt 204 positioned adjacent to the lower conveyor belt 202. The lower conveyor belt 202 can collect the material and transport the material to the upper conveyor belt 204, while the upper conveyor belt 204 transports the material to the discharge location. In various embodiments, the upper conveyor belt 204 may be movable relative to the lower conveyor belt 202 in a vertical direction and/or a horizontal direction so as to adjust the conveyor system 200 with respect to the discharge location.

Figure 10:
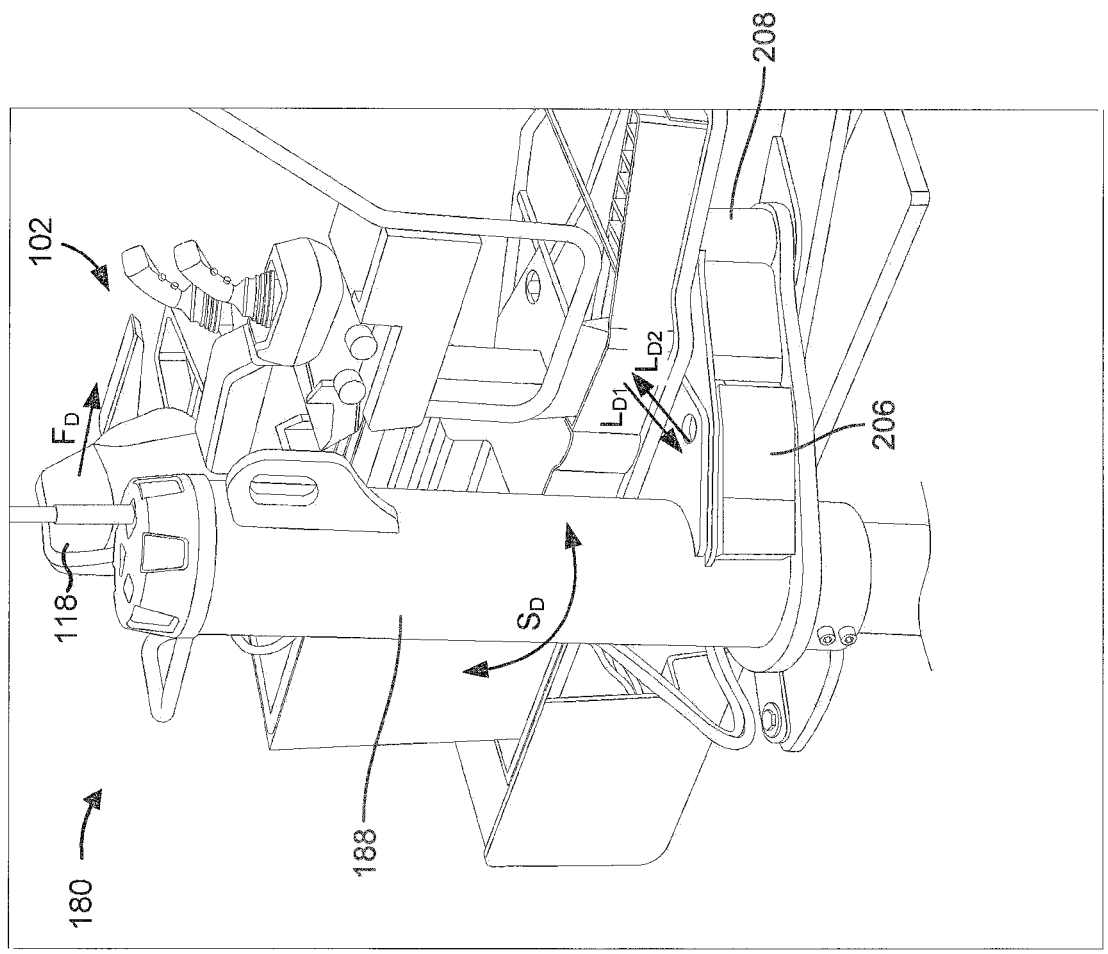
FIG. 10 is a partial right front perspective view of the example machine of FIG. 1 showing the moveable operator station and a moveable component of the machine.
Figure 11:
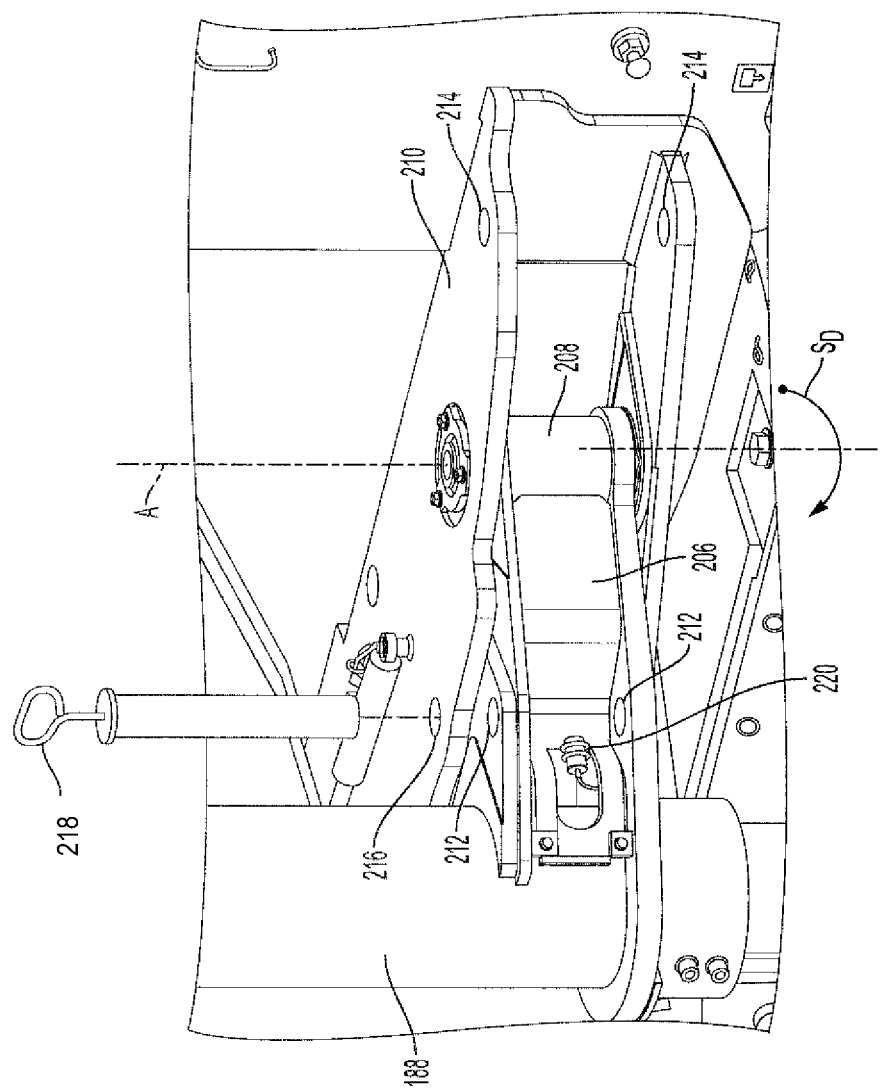
FIG. 11 is a partial perspective view of moveable component and support bracket for the moveable component.

Referring to FIGS. 10-11, the operator station 102 may be as described in FIGS. 1-8 above. In some implementations, the operator station 102 and/or one or more components (e.g., operator chair 118) thereof, may be provided in a facing direction FD, and remain in the facing direction FD during movement of the operator station 102 in a first linear direction LD1 and/or a second linear direction LD2, as described above. In this way, an operator may have improved visibility of a cutting operation being performed by machine 180.

In some implementations, one or more of the legs 188, and associated ground engaging unit 182, may be movable to provide additional stability of the machine 180 during a cutting process, and/or modify a cutting width associated with the machine 180. In the illustrated implementation of FIGS. 10-11, the right rear leg 188 of the machine 180 is movable. In other implementations, one or more hydraulic legs other than, or in addition to, the right rear leg 188 may be moveable.

The right rear leg 188 includes a radially extending arm 206 having a distal end 208 configured to be received in and mounted to move (e.g., swivel, swing, and/or the like) in a swivel direction SD relative to a support bracket 210 about an axis A. The right rear leg 188 can move between a first position, such as the inboard position shown in FIGS. 12-13, and a second position, such as the outboard position shown in FIGS. 11 and 14-15.

The arm 206 includes a pair of vertically aligned first locking pin bores 212, and a pair of vertically aligned second locking pin bores (not shown). The support bracket 210 includes a pair of vertically aligned third locking pin bores 214 associated with the first position of the right rear leg 188 and a pair of vertically aligned fourth locking pin bores 216 associated with the second position of the right rear leg 188. In FIG. 11, the pair of fourth locking pin bores 216 are vertically aligned with the second locking pin bore (not shown), which are covered in FIG. 11 by the arm. The pair of second locking pin bores (not shown) are substantially similar to the first locking in bores 212 but arranged adjacent the opposite side of the arm 206 as the first locking pin bores 212. In other implementations, however, the number of first locking pin bores 212, the number of second locking pin bores, the number of third locking pin bores 214, and the number of fourth locking pin bores 216 may each be more than or less than two.

A locking pin 218 is configured to be received in the locking pin bores. In particular, when the right rear leg 188 is in the first position, the pair of first locking pin bores 212 are vertically aligned with the pair of third locking pin bores 214 and the locking pin 218 may be received through the aligned first and third locking pin bores 212, 214 to lock the right rear leg 188 in the first position. Similarly, when the right rear leg 188 is in the second position, the pair of second locking pin bores (not shown) are vertically aligned with the pair of fourth locking pin bores 216 and the locking pin 218 may be received through the aligned second and fourth locking pin bores to lock the right rear leg 188 in the second position.

The machine 180 may include one or more sensors configured for sending a signal indicative of the position of the right rear leg 188. The one or more sensors may be configured in a variety of ways, including number of sensors, type of sensors, location and orientation of sensors, and what the sensors are detecting. In the illustrated implementation, a first proximity sensor 220 is mounted on the arm 206 of the right rear leg 188 proximate to where the locking pin 218 would be located when installed through the first locking pin bores 212 of the arm 206. The first proximity sensor 220 is configured to sense if the locking pin 218 is received through the first locking pin bores 212 and send a signal to the controller 190 indicative of whether or not the locking pin 218 is so received. In the exemplary implementation, a second proximity sensor (not shown) is mounted on the arm 206 of the right rear leg 188 proximate to where the locking pin 218 would be located when installed through the second locking pin bores (not shown) of the arm 206. The second proximity sensor (not shown) is configured to sense if the locking pin 218 is received through the second locking pin bores (not shown) and send a signal to the controller 190 indicative of whether or not the locking pin 218 is so received. The second locking proximity sensor (not shown) is positioned relative to the second locking pin bores (not shown) similarly to how the first proximity sensor 220 is positioned relative to the first locking pin bores 212.

The machine 100 may be configured to move the right rear leg 188 in a variety of ways. For example, an actuator 222 (FIGS. 14-15), such as for example, a hydraulic cylinder, may be arranged to move right rear leg 188 between the first (inboard) and second (outboard) positions. In some embodiments, the one or more sensors may be configured to detect the position of the right rear leg 188. For example, the one or more sensors may be configured to detect an amount of extension or retraction of a piston, and/or a rod attached thereto, of the actuator 222, and the controller 190 may be configured to determine the position of the right rear leg 188 based on the signal from the one or more sensors.

The controller 190, the proximity sensors, and other components may be part of a system 224 configured to limit the movement of the operator station 102 in certain situations. The controller 190 controls movement of the operator station 102 and may, in some situations, reduce the range of motion of the operator station 102, such as for example, limit how far the operator station 102 may move outside of the machine frame 186. The controller 190 may also prevent the operator station 102 and/or another moveable component of the machine 180 from moving in certain situations. For example, in some implementations, the controller 190 is configured to limit or prevent movement of the operator station 102 in response to the position of another moveable component of the machine 100.

The moveable component used to limit movement of the operator station 102 may vary in different implementations. For example, any moveable component that may be moved into a position that may interfere with the movement of the operator station may be used. In the illustrated implementation, the position of the right rear leg 188 is used. In other embodiments, however, a different moveable component may be used, such as for example, a service panel that might open in the floor, or other location, that could be damaged should the operator station move while the panel is open. Another example may be access ladder to the operator station that may move position, for example, from access or egress. Further, in some machines, moveable implements used by the machine may, in some positions, interfere with the movement of the operator station.

As described above, and in some implementations, the spatial location and/or position of the operator station 102 may be determined by way of a sensor device (e.g., the sensor device 148, FIG. 5) provided in an actuating member (e.g., the actuating member 142, FIG. 5) associated with the operator station 102. In this way, a spatial location and/or position of platform 110 may be determined based on information (e.g., an amount of piston or rod extension, retraction, and/or the like) received from the sensor device. For example, the information received from the sensor device may be used to determine a distance that the operator station 102 has moved in relation to the machine 180 and/or a location of the operator station 102 relative to the machine 180. Such information may be used by the controller 190 to limit the amount by which the operator station 102 may extend from the machine 180. In this way, the operator station 102 may be prevented from moving too great a distance outside of the frame 186 of the machine 180.

Figure 12:
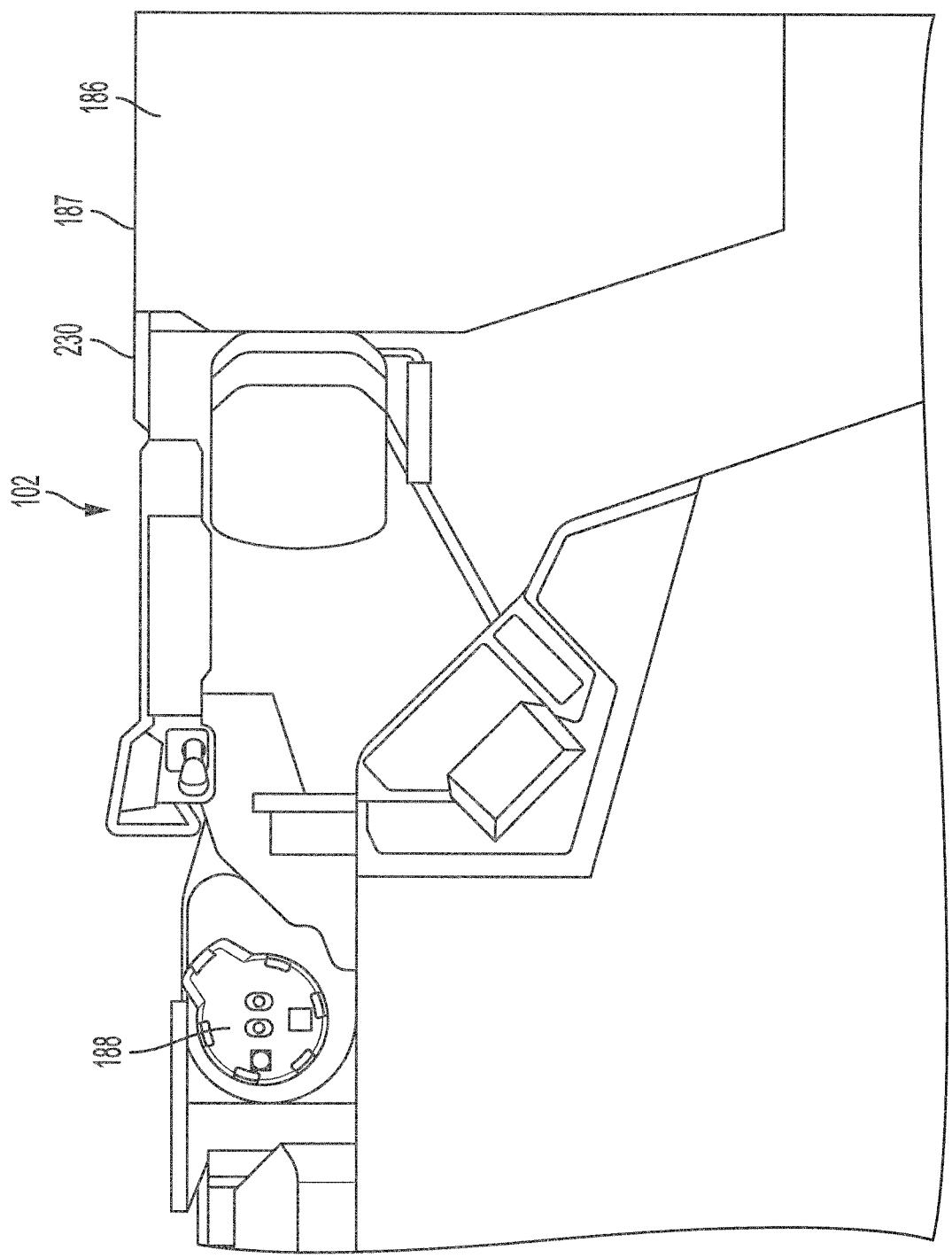
FIG. 12 is a partial top view of the machine of FIG. 1 showing the operator station in a retracted position and the movable component in an inboard position.

FIGS. 12-15 illustrate the operator station 102 and the right rear leg 188 in various positions. Referring to FIG. 12, the operator station 102 is in a standard, retracted position such that a right outer side wall or edge 230 of the operator station 102 is flush with, or inward relative to, the lateral outer wall 187 of the frame 186. Further, the right rear leg 188 is in the inboard (first) position such that the first locking pin bores 212 are aligned with the third locking pin bores 214 and the locking pin 218 is received therethrough.

Figure 13:
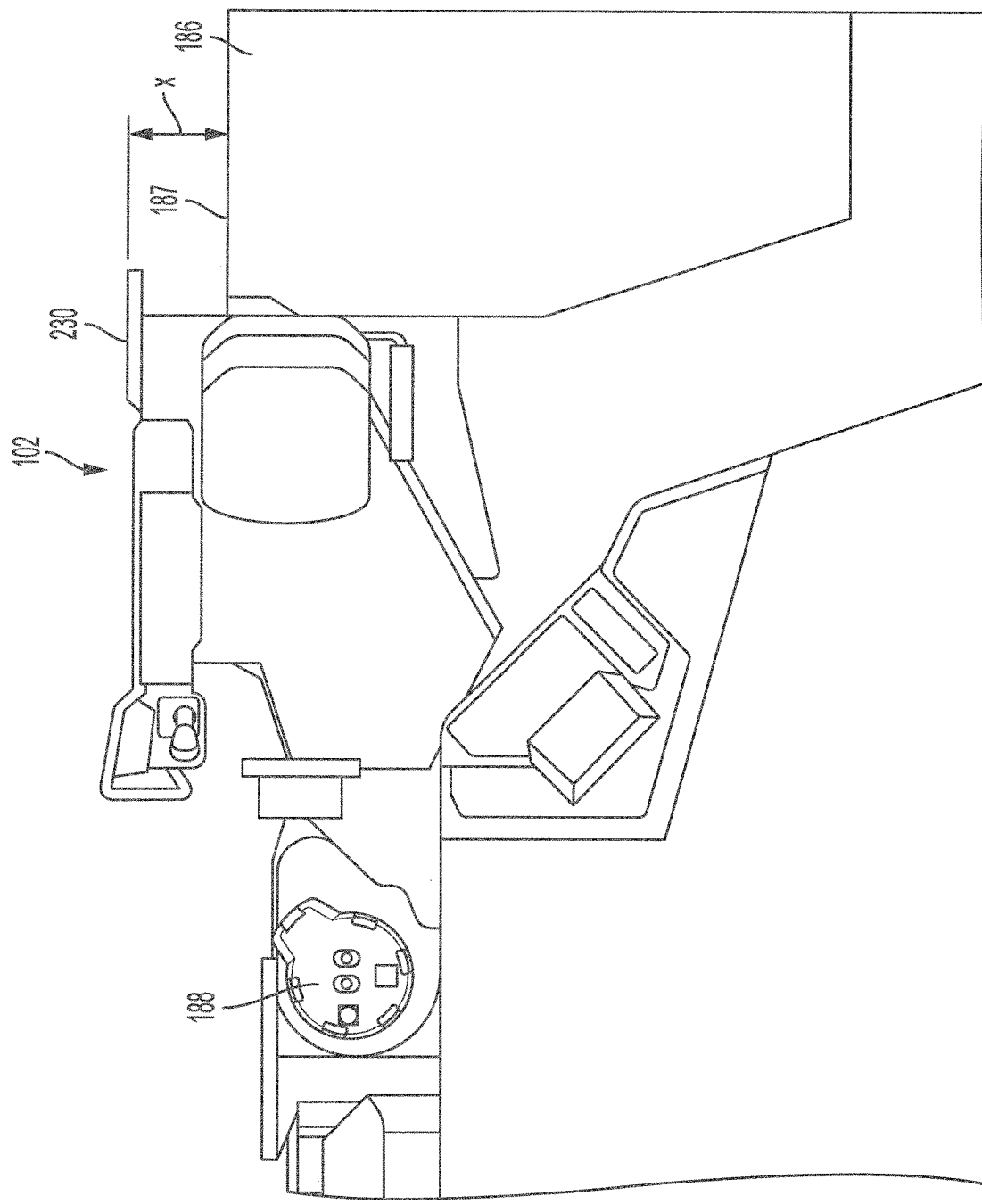
FIG. 13 is a partial top view of the machine of FIG. 1 showing the operator station in an extended position and the movable component in an inboard position.

When the right rear leg 188 is in the inboard (first) position and the locking pin 218 is received through the first locking pin bores 212, the first proximity sensor 220 detects the locking pin 218 and sends a signal to the controller 190 indicating such. The controller 190 is configured to not limit the movement of the operator station 102, as a function of the position of the right rear leg 188, when the right rear leg 188 is in the inboard (first) position and the locking pin 218 is received through the first locking pin bores 212. Thus, as shown in FIG. 13, the operator station 102 may move laterally to a fully-extended position, which is outward beyond the lateral outer wall 187 of the frame 186 the full distance (i.e., range of motion) that the operator station 102 is capable of moving, illustrated as distance X in FIG. 13. For example, in one implementation, the distance X the operator station 102 is greater than 200 mm, or 215 mm.

Figure 14:
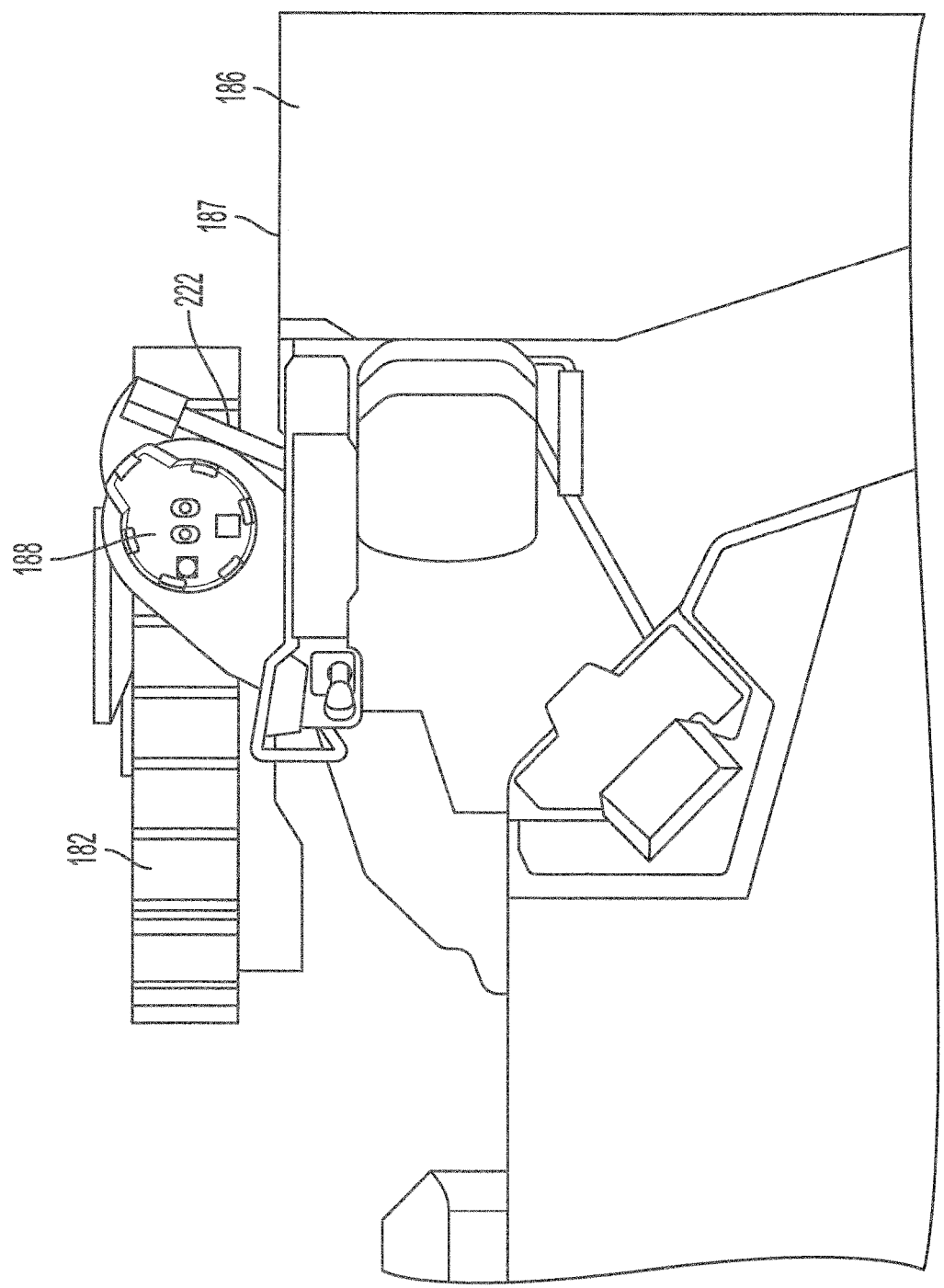
FIG. 14 is a partial top view of the machine of FIG. 1 showing the operator station in a retracted position and the movable component in an outboard position.

Referring to FIG. 14, the operator station 102 is in a standard, non-extended position (i.e. retracted position) such that a right outer side wall or side edge 230 of the operator station 102 is flush with, or inward relative to, the lateral outer wall 187 of the frame 186. The right rear leg 188 is in the outboard (second) position such that the second locking pin bores (not shown) are aligned with the fourth locking pin bores 216 and the locking pin 218 is received therethrough.

When the right rear leg 188 is in the outboard (second) position and the locking pin 218 is received through the second locking pin bores, the second proximity sensor (not shown) detects the locking pin 218 and sends a signal to the controller 190 indicating the presence of the locking pin 218. The controller 190 is configured to limit movement of the operator station 102, as a function of the position of the right rear leg 188, when the right rear leg 188 is in the outboard (second) position and the locking pin 218 is received through the second locking pin bores.

Figure 15:
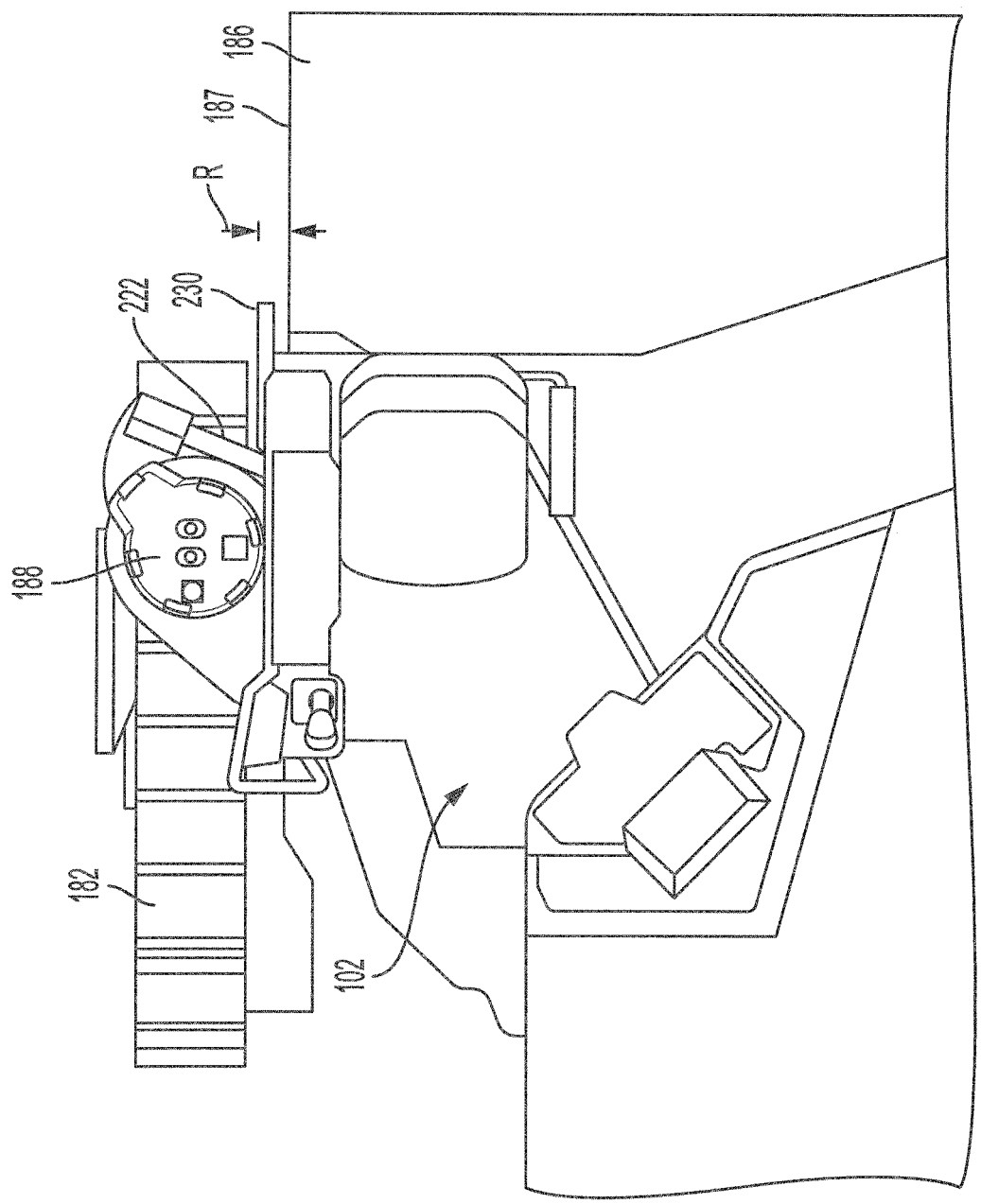
FIG. 15 is a partial top view of the machine of FIG. 1 showing the operator station in a partially extended position and the movable component in an outboard position.

Thus, as shown in FIG. 15, the operator station 102 may move laterally outward beyond the lateral outer wall 187 of the frame 186 only a limited distance, illustrated as distance R in FIG. 15. For example, in one implementation, the distance R is less than 70 mm, or 65 mm. In some implementations, the ratio of the distance between the fully extended distance X and the limited distance R is in the range of 2.8:1 to 3.8:1, or in the range of 3:1 to 3.5:1.

In some implementations, the controller 190 is configured to limit movement of the operator station 102 any time that the right rear leg 188 is not detected in the inboard (first) position, regardless of whether the right rear leg 188 is fully in the outboard (second) position. For example, the controller 190 may limit movement of the operator station 102 when the right rear leg 188 is at any position between the inboard position shown in FIG. 12 and the outboard position shown in FIG. 14. Still further, the controller 190 may limit movement of the operator station 102 and/or prevent operation of the machine, any time that the locking pin 218 is not detected as being in place through the first locking pin bores 212, even if the right rear leg 188 is in the inboard position. Thus, if the locking pin 218 is not in place, the right rear leg 188 may be considered in the outboard position and movement of the operator station 102 is limited to extend the distance R. Further, in some embodiments, if the locking pin 218 is not installed, regardless of the position of the right rear leg 188. the controller 190 may be configured to prevent operation of the machine, such as, for example, prevent movement of the machine, movement of the operator station 102, or operation of the milling system 194.

In a similar manner, the controller 190 may prevent or limit movement of the right rear leg 188 as a function of the position of the operator station 102. For example, if the operator station 102 is extended beyond the limited distance R, the controller 190 may prevent the right rear leg 188 from moving from the inboard (first) position. If the operator station 102 is extended but less than the limited distance R, then the controller 190 may allow the right rear leg 188 to move between the inboard (first) position and the outboard (second) position.

INDUSTRIAL APPLICABILITY

The system 224 for limiting the movement of the moveable operator station 102 may be used on any machine (e.g., the machines 100, 180) with a moveable operator station 102, such as a cold planer or a rotary mixer. The system 224 can determine the position of another moveable component (e.g., right rear leg 188) of the machine and limit the movement of the operator station 102 depending on what position the other component is in.

Figure 16:
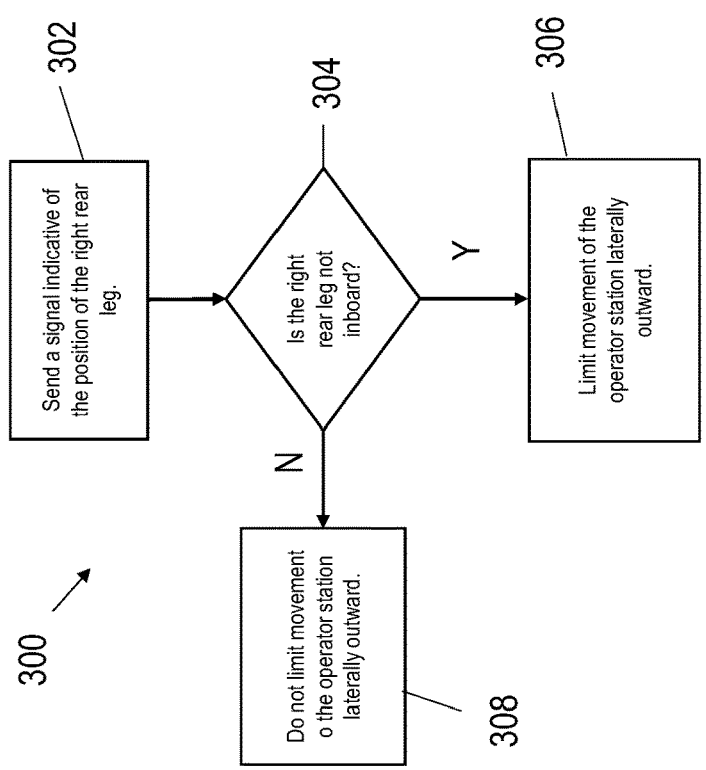
FIG. 16 is a flow chart of an example method of preventing interference between the operator station and the moveable component.

For example, as shown in FIG. 16, a method 300 of preventing interference between the moveable operator station 102 and the right rear leg 188, or a different moveable component, of the mobile machine, may include sending a signal indicative of the position of the right rear leg 188, at step 302. The controller 190, at step 304, determines if the right rear leg 188 is not in the inboard position, based upon the signal. If the right rear leg 188 is not in the inboard position, the controller 190, at step 306 may limit movement of the operator station 102 laterally outward of the retracted position to the second distance R, which is less than the first distance X. In this way, the operator station 102 is prevented from contacting the right rear leg 188 when the right rear leg 188 is disposed in an outboard position.

If the right rear leg 188 is indicated as being in the inboard position, the controller 190 may not limit movement of the operator station 102, at step 308. Thus, the operator station 102 may move laterally outward beyond the lateral outer wall 187 of the frame 186 to a fully extended position, if desired. In this way, an operator may, at least partially, be positioned laterally outside the lateral outer wall 187 of the frame 186, which may improve the operator's visibility over a task being performed by the machine. Moreover, positioning the operator outside the lateral outer wall 187 of the frame 186 may reduce an amount of physical exertion required by the operator in obtaining a satisfactory view of the task, which may reduce operator fatigue.

Figure 17:
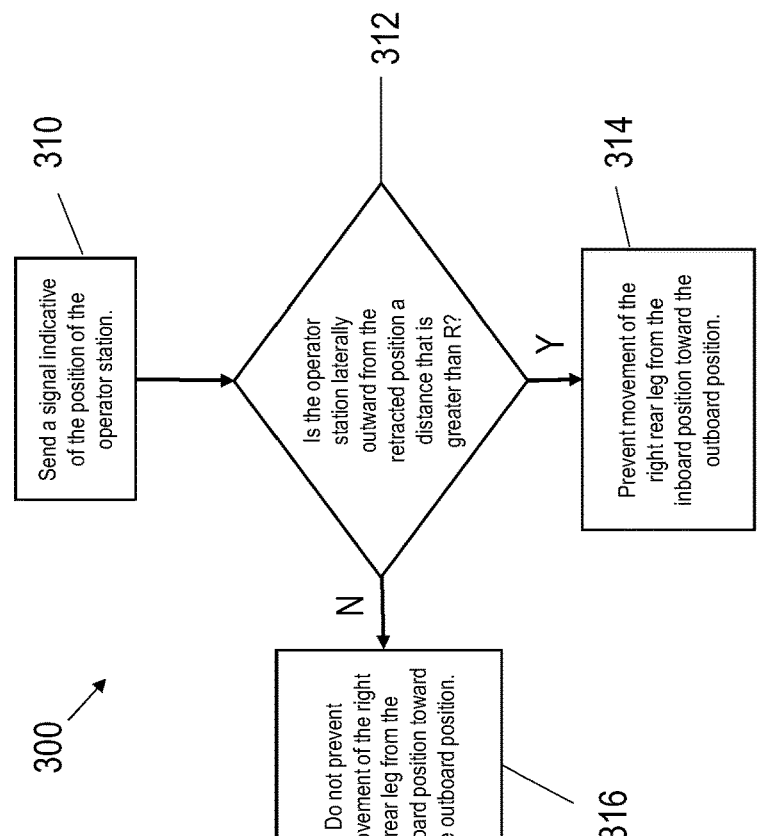
FIG. 17 is a flow chart of another example method of preventing interference between the operator station and the moveable component.

As shown in FIG. 17, the method 300 of preventing interference between the moveable operator station 102 and the right rear leg 188, or another moveable member, may also be based on the position of the operator station 102. For example, the method 300 may include sending a signal indicative of the position of the operator station 102, at step 310. The controller 190, at step 312, determines if the operator station 102 is laterally outward from the retracted position a distance that is greater than the second distance R. If the operator station 102 is laterally outward from the retracted position a distance that is greater than the second distance R, the controller 190, at step 314, may prevent movement of the right rear leg 188 from the inboard position toward the outboard position. In this way, the right rear leg 188 is prevented from contacting the operator station 102 when the operator station 102 is laterally extended.

If the operator station 102 is indicated as being laterally outward from the retracted position a distance that is less than the second distance, or in the retracted position, the controller 190 may not prevent movement of the right rear leg 188 to the outboard position, at step 316.

While the system is illustrated as implemented on a cold planer, it may be used on other types of machines with moveable operator stations. Unless otherwise indicated herein, all sub-embodiments and optional embodiments are respective sub-embodiments and optional embodiments to all embodiments described herein. While the present disclosure has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the present disclosure, in its broader aspects, is not limited to the specific details, the representative compositions or formulations, and illustrative examples shown and described. Accordingly, departures may be made from such details without departing from the spirit or scope of Applicant's general disclosure herein.

What is claimed is:

1. A mobile machine, comprising:
   a machine frame having a lateral outer wall;
   an operator station located on the machine frame, the operator station having an outer side edge;
   an actuating system configured to move the operator station between a retracted position and a fully extended position that is laterally outward of the retracted position, wherein in the fully extended position, the outer side edge is a first distance outward of the lateral outer wall;
   a moveable component moveable between a first position and a second position;
   a sensor configured to send a signal indicative of the moveable component being in the first position;
   a controller configured to limit the distance the operator station may move laterally outward of the retracted position to a second distance in response to receiving the signal from the sensor, wherein the second distance is less than the first distance.

2. The mobile machine of claim 1, wherein the moveable component is a leg having a ground engaging unit mounted thereto.

3. The mobile machine of claim 1, further comprising a locking pin for locking the moveable component in the first position and one or more first locking pin bores associated with the moveable component for receiving the locking pin.

4. The mobile machine of claim 3, wherein the signal indicative of the moveable component being in the first position include detecting the locking pin received through the one or more first locking pin bores.

5. The mobile machine of claim 1, wherein the controller is configured to limit operation of the mobile machine in the absence of receiving a signal indicative of the locking pin being received through the one or more first locking pin bores.

6. The mobile machine of claim 1, wherein the signal indicative of the moveable component being in the first position include detecting the position of the moveable component.

7. The mobile machine of claim 1, wherein the ratio of first distance to second distance is in the range 2.8:1 to 3.8:1.

8. The mobile machine of claim 1, wherein when the moveable component is in the first position, the controller is configured to prevent movement of the moveable component from the first position when the outer side edge is a distance outward of the lateral outer wall that is greater than the second distance.

9. The mobile machine of claim 1, wherein when the outer side edge is a distance outward of the lateral outer wall that is less than the second distance, the controller is configured to allow movement of the moveable component from the first position to the second position.

10. The mobile machine of claim 1, wherein the actuating system comprises a hydraulic cylinder having a piston slidably moveable within the cylinder, and a sensing device configured to detect the position of the piston within the cylinder.

11. A method of preventing interference between a moveable operator station of a mobile machine and a moveable component of the mobile machine, where the operator station is moveable between a retracted position and a fully extended position that is a first distance laterally outward of the retracted position, the method including:
   sending a signal indicative of the moveable component being in a first position;
   limiting movement of the operator station laterally outward of the retracted position to a second distance that is less than the first distance.

12. The method of claim 11, wherein the moveable component is a leg having a ground engaging unit mounted thereto.

13. The method of claim 11, wherein the signal indicative of the moveable component being in the first position includes detecting the presence of a locking pin received within one or more first locking pin bores.

14. The method of claim 13, further comprising limiting operation of the mobile machine in the absence of receiving a signal indicative of the locking pin being received through the one or more first locking pin bores.

15. The method of claim 11, wherein the signal indicative of the moveable component being in the first position include detecting the position of the moveable component.

16. The method of claim 11, further comprising preventing movement of the moveable component from the first position when the operator station is laterally outward from the retracted position a distance that is greater than the second distance.

17. The method of claim 11, wherein the ratio of first distance to second distance is in the range 2.8:1 to 3.8:1.

18. The method of claim 11, further comprising allowing movement of the moveable component from the first position to the second position when the operator station is laterally outward from the retracted position a distance that is less than the second distance.

19. The method of claim 11, wherein sending a signal indicative of the moveable component being in the first position includes detecting a position of a piston within a cylinder of an actuator configured to move the moveable component.

20. The method of claim 11, further comprising detecting a position of a piston within a cylinder of an actuator configured to move the operator station.

* * * * *